US011284368B2

(12) United States Patent
Xu et al.

(10) Patent No.: US 11,284,368 B2
(45) Date of Patent: Mar. 22, 2022

(54) WIRELESS COMMUNICATION METHOD, CONTROL DEVICE, NODE, AND TERMINAL DEVICE

(71) Applicant: HUAWEI TECHNOLOGIES CO., LTD., Guangdong (CN)

(72) Inventors: Jianbiao Xu, Shanghai (CN); Liwei Ge, Shanghai (CN); Youtuan Zhu, Shanghai (CN); Yiping Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 284 days.

(21) Appl. No.: 16/563,378

(22) Filed: Sep. 6, 2019

(65) Prior Publication Data

US 2019/0394742 A1 Dec. 26, 2019

Related U.S. Application Data

(63) Continuation of application No. PCT/CN2017/076111, filed on Mar. 9, 2017.

(51) Int. Cl.
*H04W 56/00* (2009.01)
*H04B 7/024* (2017.01)
(Continued)

(52) U.S. Cl.
CPC ........ *H04W 56/0045* (2013.01); *H04B 7/024* (2013.01); *H04L 5/0048* (2013.01);
(Continued)

(58) Field of Classification Search
CPC ................ H04B 7/024; H04L 27/2657; H04L 27/2662; H04L 5/0048; H04W 56/0005;
(Continued)

(56) References Cited

U.S. PATENT DOCUMENTS

2004/0008646 A1 1/2004 Park et al.
2007/0147337 A1* 6/2007 Bosch .................. H04B 7/2681
370/350
(Continued)

FOREIGN PATENT DOCUMENTS

CN 102917393 A 2/2013
CN 103037498 A 4/2013
(Continued)

OTHER PUBLICATIONS

PCT International Search Report and Written Opinion issued in International Application No. PCT/CN2017/076111 dated Jun. 29, 2017, 16 pages (with English translation).
(Continued)

*Primary Examiner* — Khaled M Kassim
(74) *Attorney, Agent, or Firm* — Fish & Richardson P.C.

(57) ABSTRACT

The present disclosure relates to coordinated multipoint wireless communications methods. One example method includes predicting a first delay difference between receiving, by a terminal device, downlink data from a beam A of a first node and receiving, by the terminal device, the downlink data from a beam B of a second node, where the terminal device is located in a coverage area in which the beam A intersects with the beam B, and determining a first adjustment time period based on the first delay difference, where the first adjustment time period is used to adjust a transmission time in which the first node transmits the downlink data to the terminal device by using the beam A.

12 Claims, 11 Drawing Sheets

(51) Int. Cl.
    *H04L 5/00*     (2006.01)
    *H04L 27/26*     (2006.01)
    *H04W 72/04*     (2009.01)

(52) U.S. Cl.
    CPC ...... *H04L 27/2657* (2013.01); *H04L 27/2662* (2013.01); *H04W 56/0005* (2013.01); *H04W 72/042* (2013.01)

(58) Field of Classification Search
    CPC ......... H04W 56/0045; H04W 56/0065; H04W 72/042
    See application file for complete search history.

(56) References Cited

U.S. PATENT DOCUMENTS

| | | | |
|---|---|---|---|
| 2008/0298264 A1* | 12/2008 | Ramesh | H04B 7/0671 370/252 |
| 2009/0279512 A1* | 11/2009 | Fujishima | H04W 24/00 370/336 |
| 2012/0093016 A1* | 4/2012 | Zhang | H04B 7/0413 370/252 |
| 2012/0178482 A1 | 7/2012 | Seo et al. | |
| 2013/0083780 A1* | 4/2013 | Luo | H04B 7/0671 370/336 |
| 2013/0315321 A1 | 11/2013 | Rajagopal et al. | |
| 2014/0148186 A1 | 5/2014 | Zhou et al. | |
| 2014/0219162 A1* | 8/2014 | Eyuboglu | H04L 27/34 370/315 |
| 2014/0226640 A1 | 8/2014 | Zhu et al. | |
| 2014/0314167 A1 | 10/2014 | Jeong et al. | |
| 2015/0131634 A1 | 5/2015 | Luo et al. | |
| 2015/0223194 A1* | 8/2015 | Li | H04L 27/2601 455/456.1 |
| 2016/0227298 A1* | 8/2016 | White | H04Q 9/04 |
| 2017/0302419 A1* | 10/2017 | Liu | H04L 5/0082 |
| 2018/0219717 A1 | 8/2018 | Lee et al. | |
| 2021/0075573 A1* | 3/2021 | Manolakos | H04W 72/0413 |

FOREIGN PATENT DOCUMENTS

| | | |
|---|---|---|
| CN | 103298002 A | 9/2013 |
| CN | 103427895 A | 12/2013 |
| CN | 103875198 A | 6/2014 |
| CN | 105324944 A | 2/2016 |
| WO | 2014164234 A1 | 10/2014 |
| WO | 2017007189 A1 | 1/2017 |

OTHER PUBLICATIONS

Extended European Search Report issued in European Application No. 17899268.1 dated Jan. 30, 2020, 8 pages.

Office Action issued in Chinese Application No. 201780086075.8 dated Mar. 30, 2020, 20 pages (with English translation).

* cited by examiner

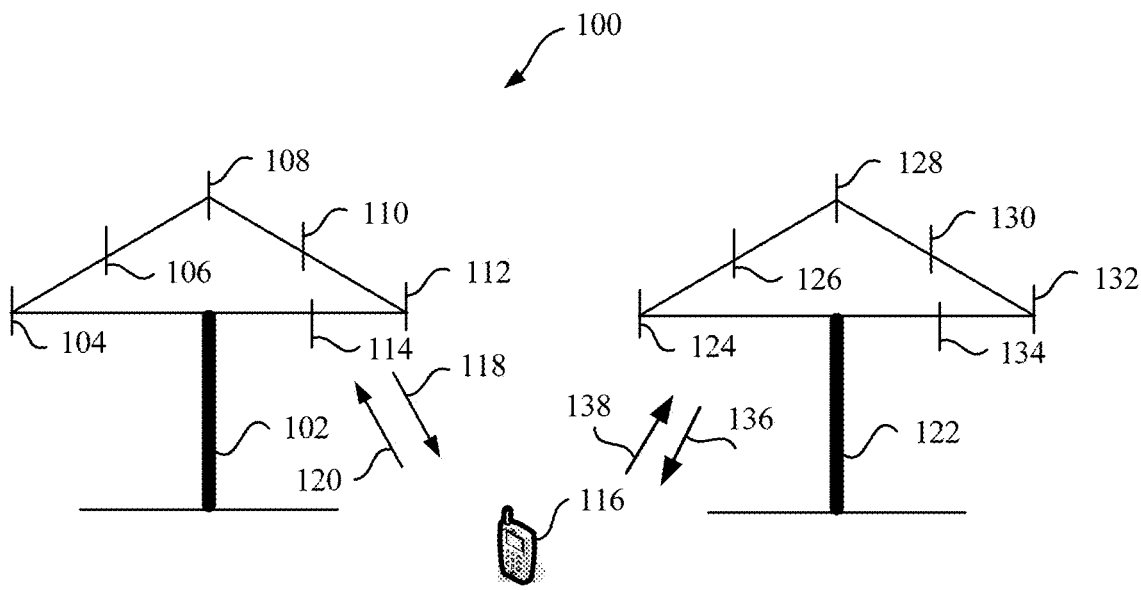

Predict a first delay difference between receiving, by a terminal device, downlink data from a beam A of a first node and receiving, by the terminal device, downlink data from a beam B of a second node, where the terminal device is located in a coverage area in which the beam A intersects with the beam B — 210

Determine a first adjustment time period based on the first delay difference, where the first adjustment time period is used to adjust a transmission time in which the first node transmits the downlink data to the terminal device by using the beam A, so that a delay difference between receiving, by the terminal device, the downlink data from the beam A and receiving, by the terminal device, the downlink data from the beam B is less than a predetermined value — 220

FIG. 2

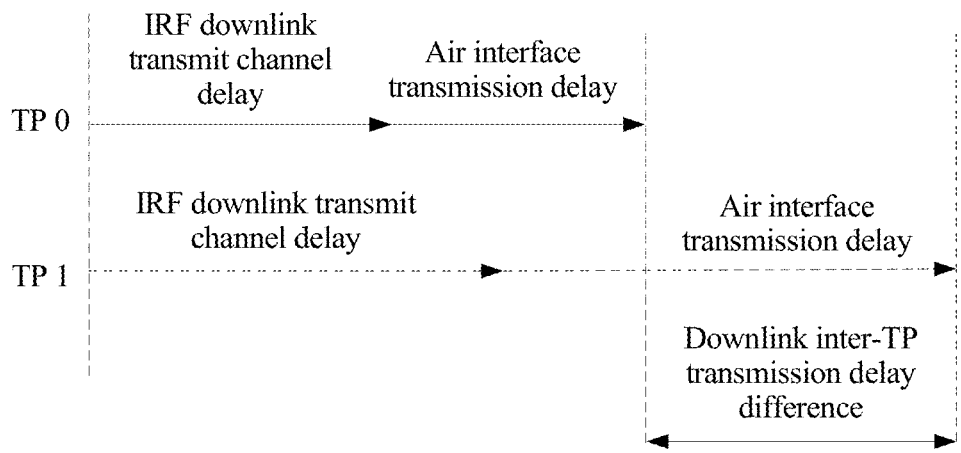

A first node obtains a first adjustment time period, where the first adjustment time period is used to adjust a transmission time in which the first node transmits downlink data to a first terminal device by using a beam A, and the first terminal device is located in a coverage area in which the beam A of the first node intersects with a beam B of a second node ╱ 310

The first node determines, based on the first adjustment time period, the transmission time in which the downlink data is transmitted to the first terminal device by using the beam A ╱ 320

The first node sends the downlink data to the first terminal device by using the beam A based on the transmission time ╱ 330

FIG. 7

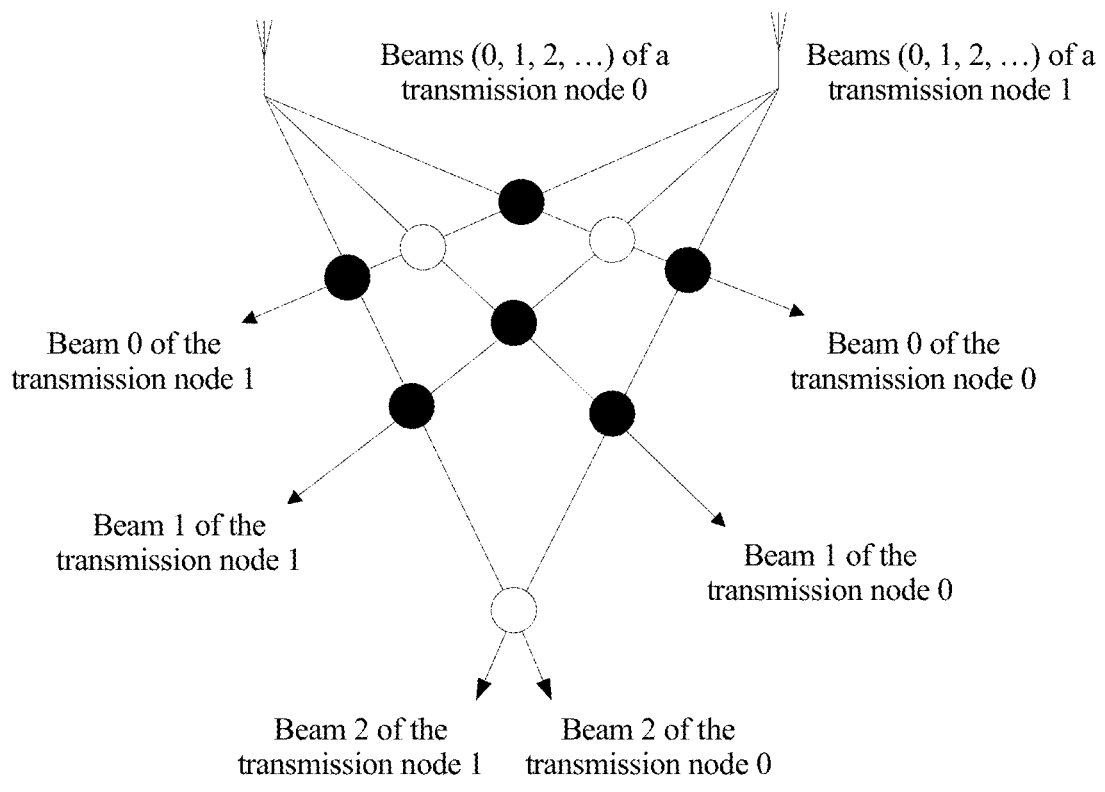
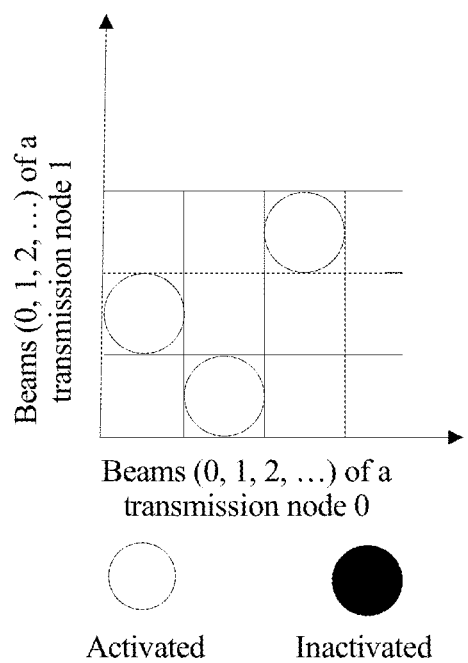
FIG. 12

400

A terminal device determines a first delay difference between receiving a downlink pilot signal from a beam A of a first node and receiving a downlink pilot signal from a beam B of a second node, where the terminal device is located in a coverage area in which the beam A intersects with the beam B  /410

Send the first delay difference to a control device, so that the control device predicts, based on the first delay difference, a delay difference between receiving, by the terminal device, downlink data from the beam A of the first node and receiving, by the terminal device, the downlink data from the beam B of the second node  /420

FIG. 13

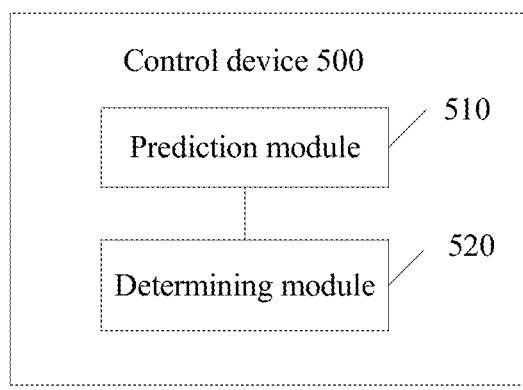

FIG. 14

WIRELESS COMMUNICATION METHOD, CONTROL DEVICE, NODE, AND TERMINAL DEVICE

CROSS-REFERENCE TO RELATED APPLICATIONS

This application is a continuation of International Application No. PCT/CN2017/076111, filed on Mar. 9, 2017, the disclosure of which is hereby incorporated by reference in its entirety.

TECHNICAL FIELD

This application relates to the communications field, and more specifically, to a wireless communication method, a control device, a node, and a terminal device.

BACKGROUND

Because there are abundant spectrum resources and a massive antenna array is easy to deploy, a millimeter wave band gradually becomes one of key candidate technologies of 5G. Particularly, because an antenna array spacing at the millimeter wave band is smaller, massive multiple-input multiple-output (MIMO) may be deployed on a base station (BS) side, and at least four antennas may also be usually deployed on a terminal device (MS) side.

However, due to a ratio of a line of sight (LOS) path component on a high-frequency channel, for a single node (Transmission point, TP) and a single terminal device, a spatial degree of freedom is mainly limited by the channel, and spatial resolution and spatial multiplexing potential of the massive antenna array cannot be effectively realized.

In a coordinated multipoint technology, spatial degrees of freedom and a power superposition gain of a plurality of nodes are obtained, so that the spatial resolution and the spatial multiplexing potential of the massive antenna array on the high-frequency channel are effectively realized, thereby effectively improving system spectral efficiency. However, in a coordinated transmission mode, in addition to a multipath delay spread inherent in a single-cell channel, there is an inter-TP delay difference between a plurality of nodes. The delay difference between nodes includes an air interface transmission delay difference and an intermediate radio frequency (IRF) timing error. The delay difference between nodes increases a multipath delay spread of a coordinated equivalent channel. Therefore, when a ratio of the inter-TP delay difference to a cyclic prefix (CP) reaches a specific value, the multipath delay spread of the coordinated equivalent channel exceeds the CP, interference such as orthogonal frequency division multiplexing (OFDM) intersymbol interference (ISI) is introduced, and a coordinated range shrinks.

A long term evolution (LTE) system is mainly specific to a low frequency, an OFDM subcarrier spacing is 15 kHz, and a corresponding CP length is about of a magnitude of 5 µs. In a 5G high-frequency system, to resist a larger frequency offset, a subcarrier spacing needs to be increased (to a magnitude of 150 kHz). Correspondingly, in the 5G high-frequency system, a magnitude of a CP length is reduced by 10 times compared with the magnitude of the CP length in the LTE system. Consequently, a ratio of an inter-TP delay difference to a CP is larger, and there is a higher probability that a delay spread of a coordinated equivalent channel exceeds the CP. Therefore, a problem to be urgently resolved is how to reduce the delay difference between nodes, reduce the probability that the delay spread of the coordinated equivalent channel exceeds the CP, and avoid interference such as ISI between OFDM symbols and shrinkage of a coordinated range.

SUMMARY

This application provides a wireless communication method and a device, to implement a beam-level signal transmission pre-adjustment on a node side. As a result, a delay difference between receiving, by the terminal device, downlink data from a beam A of a first node and receiving, by the terminal device, the downlink data from a beam B of a second node is less than a predetermined value. This resolves an ISI interference problem and a coordinated area shrinkage problem that are introduced due to an inter-TP air interface transmission delay difference and intermediate radio frequency channel timing error in a coordinated technology, thereby effectively increasing a coordinated area and a coordinated gain particularly in a scenario of a shorter CP in a 5G high-frequency system.

According to a first aspect, this application provides a wireless communication method, used in a coordinated multipoint system that includes a plurality of nodes, where the method includes: predicting a first delay difference between receiving, by a terminal device, downlink data from a beam A of a first node and receiving, by the terminal device, the downlink data from a beam B of a second node, where the terminal device is located in a coverage area in which the beam A intersects with the beam B; and determining a first adjustment time period based on the first delay difference, where the first adjustment time period is used to adjust a transmission time in which the first node transmits the downlink data to the terminal device by using the beam A, so that a delay difference between receiving, by the terminal device, the downlink data from the beam A and receiving, by the terminal device, the downlink data from the beam B is less than a predetermined value.

Therefore, in this application, the first delay difference between receiving, by the terminal device, the downlink data from the beam A of the first node and receiving, by the terminal device, the downlink data from the beam B of the second node is predicted, and the transmission time in which the first node sends the downlink data to the terminal device by using the beam A is determined based on the first delay difference, to implement a beam-level signal transmission pre-adjustment on a node side. As a result, a delay difference between arrival, at the first terminal device, of the downlink data sent by the first node to the first terminal device and arrival, at the first terminal device, of the downlink data sent by the second node to the first terminal device is less than the predetermined value. This resolves an ISI interference problem and a coordinated area shrinkage problem that are introduced due to an inter-TP air interface transmission delay difference and an inter-TP IRF timing error in a coordinated technology, thereby effectively increasing a coordinated area and a coordinated gain particularly in a scenario of a shorter CP in a 5G high-frequency system.

Optionally, in an implementation of the first aspect, the predicting a first delay difference between receiving, by a terminal device, downlink data from a beam A of a first node and receiving, by the terminal device, the downlink data from a beam B of a second node includes: obtaining a second delay difference between receiving, by the terminal device, a downlink pilot signal from the beam A of the first node and receiving, by the terminal device, a downlink pilot signal from the beam B of the second node; and predicting the first delay difference based on the second delay difference.

Optionally, in an implementation of the first aspect, the obtaining a second delay difference between receiving, by the terminal device, a downlink pilot signal from the beam A of the first node and receiving, by the terminal device, a downlink pilot signal from the beam B of the second node includes: obtaining the second delay difference between sending, by the terminal device, the downlink pilot signal to the terminal device on a first path of the beam A of the first node and sending, by the second node, the downlink pilot signal to the terminal device on a first path of the beam B. The first path is usually a line of sight (LOS) path. When there is no line of sight path on the beam A, the first path is a non-line of sight (NLOS) path with a shortest transmission distance.

Optionally, in an implementation of the first aspect, before the first node transmits the downlink data to the terminal device by using the beam A and the second node transmits the downlink data to the terminal device by using the beam B, the downlink pilot signal is a cell-level pilot signal.

In this case, the first delay difference is determined based on the second delay difference between receiving, by the terminal device, the cell-level pilot signal from the beam A of the first node and receiving, by the terminal device, the cell-level pilot signal from the beam B of the second node. Therefore, before the downlink data is transmitted, the first adjustment time period used for sending, by the first node, the downlink data to the first terminal device is determined based on the first delay difference, so that the delay difference between receiving, by the terminal device, the downlink data from the beam A and receiving, by the terminal device, the downlink data from the beam B is less than the predetermined value.

Optionally, in an implementation of the first aspect, when the first node transmits the downlink data to the terminal device by using the beam A and the second node transmits the downlink data to the terminal device by using the beam B, the downlink pilot signal is a user-level pilot signal.

In this case, the first delay difference is determined based on the second delay difference between receiving, by the terminal device, the user-level pilot signal from the beam A of the first node and receiving, by the terminal device, the user-level pilot signal from the beam B of the second node. Therefore, when the downlink data is transmitted, the first adjustment time period used for sending, by the first node, the downlink data to the first terminal device is determined based on the first delay difference, so that the delay difference between receiving, by the terminal device, the downlink data from the beam A and receiving, by the terminal device, the downlink data from the beam B is less than the predetermined value.

Optionally, in an implementation of the first aspect, the cell-level pilot signal or the user-level pilot signal or both are decoupled, and time division transmission may be performed on the cell-level pilot signal and/or the user-level pilot signal by using different subframes.

In this case, the cell-level pilot signal or the user-level pilot signal or both are decoupled, so that a transmission timing pre-adjustment to the user-level pilot signal does not affect transmission of the cell-level pilot signal.

Optionally, in an implementation of the first aspect, when a plurality of first terminal devices that perform frequency division multiplexing are in the coverage area in which the terminal device is located and in which the beam A of the first node intersects with the beam B of the second node, the method further includes: obtaining second delay differences of the plurality of first terminal devices that perform frequency division multiplexing, and estimating the first delay difference based on an average value of the second delay differences.

Optionally, in an implementation of the first aspect, the predicting a first delay difference between receiving, by a terminal device, downlink data from a beam A of a first node and receiving, by the terminal device, the downlink data from a beam B of a second node includes: obtaining a third delay difference between receiving, by the first node by using the beam A, an uplink reference signal transmitted by the first terminal device and receiving, by the second node by using the beam B, an uplink reference signal transmitted by the first terminal device; and predicting the first delay difference based on the third delay difference.

Optionally, in an implementation of the first aspect, the method further includes: controlling the first node and the second node to simultaneously transmit correction signals in an uplink/downlink switching guard period; obtaining a time in which the first node receives a correction signal sent by the second node and a time in which the second node receives a correction signal sent by the first node; and determining a fourth delay difference between an intermediate radio frequency channel of the first node and an intermediate radio frequency channel of the second node based on the time in which the first node receives the correction signal sent by the second node and the time in which the second node receives the correction signal sent by the first node; and the predicting the first delay difference based on the third delay difference includes:

predicting the first delay difference based on the third delay difference and the fourth delay difference.

Optionally, in an implementation of the first aspect, the method further includes: determining a second adjustment time period for the first node based on the first adjustment time period, where the second adjustment time period for the first node is used to adjust a transmission time in which the first node transmits a user-level pilot signal to the first terminal device in the first node by using the beam A.

According to a second aspect, this application provides a wireless communication method, used in a coordinated multipoint system that includes a plurality of nodes, where the method includes: obtaining, by a first node, a first adjustment time period, where the first adjustment time period is used to adjust a transmission time in which the first node transmits downlink data to a terminal device by using a beam A, and the terminal device is located in a coverage area in which the beam A of the first node intersects with a beam B of a second node; determining, by the first node based on the first adjustment time period, the transmission time in which the downlink data is transmitted to the terminal device by using the beam A; and sending, by the first node, the downlink data to the terminal device by using the beam A based on the transmission time.

Therefore, in this application, the first node adjusts, based on the first adjustment time period, the transmission time in which the downlink data is transmitted to the first terminal device by using the beam A, to implement a beam-level signal transmission pre-adjustment on a node side. As a result, a delay difference between arrival, at the terminal device, of the downlink data sent by the first node to the terminal device and arrival, at the terminal device, of the downlink data sent by the second node to the terminal device is less than a predetermined value.

Optionally, in an implementation of the second aspect, the determining, by the first node based on the first adjustment time period, the transmission time in which the downlink data is transmitted to the terminal device by using the beam A includes: when the first adjustment time period is greater than 0, performing zero padding on at least two subframes for transmitting the downlink data, where the time period on which null padding is performed is equal to the adjustment time period; or when the first adjustment time period is less than 0, performing null padding on a cyclic prefix part of at least one subframe for transmitting the downlink data, where a transmission time of a part on which null padding is performed and that is of the cyclic prefix part of the at least one subframe is equal to an absolute value of the adjustment time period.

In this case, zero padding is performed on the at least two adjacent subframes or null padding is performed on the cyclic prefix part of the at least one subframe based on the first adjustment time period, to achieve a timing pre-adjustment effect on the downlink data, thereby avoiding complexity of adjusting a physical transmission time at an OFDM symbol level.

Optionally, in an implementation of the second aspect, the method further includes: obtaining a second adjustment time period, where the second adjustment time period is used to adjust a transmission time in which the first node transmits a user-level pilot signal to the terminal device by using the beam A; determining, by the first node based on the second adjustment time period, the transmission time in which the user-level pilot signal is transmitted to the first terminal device by using the beam A; and sending, by the first node, the user-level pilot signal to the first terminal device by using the beam A.

Optionally, in an implementation of the second aspect, when another terminal device that performs time division multiplexing with the terminal device is on the beam A, the determining, by the first node based on the first adjustment time period, the transmission time in which the downlink data is transmitted to the terminal device by using the beam A further includes: determining, at a moment of a switchover between the terminal device and the another terminal device, whether there is intersymbol interference between the terminal device and the another terminal device; and if there is intersymbol interference between the terminal device and the another terminal device, a time interval is reserved at the moment of the switchover between the terminal device and the another terminal device.

In this case, the time interval is reserved at the moment of the switchover between the terminal device and the another terminal device that are on the transmit beam A and that perform time division multiplexing, thereby effectively avoiding intersymbol interference between the terminal device and the another terminal device.

Optionally, in an implementation of the second aspect, before the obtaining, by a first node, a first adjustment time period, the method further includes: determining the beam A corresponding to the node based on beam measurement information sent by the terminal device and/or information about whether a plurality of terminal devices that perform time division multiplexing or frequency division multiplexing are on a plurality of transmit beams of the node, where the beam measurement information is used to indicate measurement information of the plurality of transmit beams of the node that are measured by the terminal device.

Optionally, in an implementation of the second aspect, the beam measurement information includes at least one type of the following information: beam spectral efficiency, a beam signal-to-noise ratio, and a beam throughput; and the determining the beam A corresponding to the node based on beam measurement information sent by the terminal device and/or information about whether a plurality of terminal devices that perform time division multiplexing or frequency division multiplexing are on a plurality of transmit beams of the node includes: selecting at least one transmit beam from the plurality of transmit beams based on the beam measurement information; and determining the beam A from the at least one selected beam, where no other terminal devices that perform frequency division multiplexing with the first terminal device are on a beam A outside the coverage area in which the terminal device is located, and the coverage area is a coverage area in which the terminal device is located and in which the beam A intersects with the beam B.

According to a third aspect, this application provides a wireless communication method, used in a coordinated multipoint system that includes a plurality of nodes, where the method includes: determining, by a terminal device, a first delay difference between receiving a downlink pilot signal from a beam A of a first node and receiving the downlink pilot signal from a beam B of a second node, where the terminal device is located in a coverage area in which the beam A intersects with the beam B; and sending the first delay difference to a control device, so that the control device predicts, based on the first delay difference, a delay difference between receiving, by the terminal device, downlink data from the beam A of the first node and receiving, by the terminal device, the downlink data from the beam B of the second node.

In this case, the terminal device sends, to the control device, the first delay difference between receiving the downlink pilot signal from the beam A of the first node and receiving the downlink pilot signal from the beam B of the second node, so that the control device predicts, based on the first delay difference, the delay difference between receiving, by the terminal device, the downlink data from the beam A of the first node and receiving, by the terminal device, the downlink data from the beam B of the second node.

Optionally, in an implementation of the third aspect, the determining a first delay difference between receiving a downlink pilot signal from a beam A of a first node and receiving the downlink pilot signal from a beam B of a second node includes:

determining the first delay difference based on a moment at which a cell-level pilot signal is received from the beam A of the first node and a moment at which a cell-level pilot signal is received from the beam B of the second node, where the first delay difference is used by the control device to determine, in an initial transmission phase of the downlink data, an adjustment time period used for sending, by the first node, the downlink data to the first terminal device.

Optionally, in an implementation of the third aspect, the determining a first delay difference between receiving a downlink pilot signal from a beam A of a first node and receiving the downlink pilot signal from a beam B of a second node includes:

determining the first delay difference based on a moment at which a user-level pilot signal is received from the beam A of the first node and a moment at which a user-level pilot signal is received from the beam B of the second node, where the first delay difference is used by the control device to determine, in a continuous transmission phase of the downlink data, an adjustment time period used for sending, by the first node, the downlink data to the first terminal device.

Optionally, in an implementation of the third aspect, before the determining, by a terminal device, a first delay difference between receiving a downlink pilot signal from a beam A of a first node and receiving the downlink pilot signal from a beam B of a second node, the method further includes:

sending beam measurement information of a plurality of measured beams of the first node to the first node, and sending beam measurement information of a plurality of measured beams of the second node to the second node, so that the first node determines the beam A based on the beam measurement information, and the second node determines the beam B based on the beam measurement information.

According to a fourth aspect, an embodiment of this application provides a control device, including a prediction module and a determining module, and the control device may perform the method in the first aspect or any optional implementation of the first aspect.

According to a fifth aspect, an embodiment of this application provides a node, including an obtaining module, a processing module, and a sending module, and the node may perform the method in the second aspect or any optional implementation of the second aspect.

According to a sixth aspect, an embodiment of this application provides a terminal device, including a receiving module and a determining module, and the terminal device may perform the method in the third aspect or any optional implementation of the third aspect.

According to a seventh aspect, a control device is provided, including a memory, a transceiver, and a processor. The memory stores program code that may be used to instruct to perform the method in the first aspect or any optional implementation of the first aspect. The transceiver is configured to receive and send a specific signal after being driven by the processor. When the code is executed, the processor may implement the operations performed by the control device in the method.

According to an eighth aspect, a node is provided, including a memory, a transceiver, and a processor. The memory stores program code that may be used to instruct to perform the method in the second aspect or any optional implementation of the second aspect. The transceiver is configured to receive and send a specific signal after being driven by the processor. When the code is executed, the processor may implement the operations performed by the node in the method.

According to a ninth aspect, a terminal device is provided, including a memory, a transceiver, and a processor. The memory stores program code that may be used to instruct to perform the method in the third aspect or any optional implementation of the third aspect. The transceiver is configured to receive and send a specific signal after being driven by the processor. When the code is executed, the processor may implement the operations performed by the terminal device in the method.

According to a tenth aspect, a computer storage medium is provided. The computer storage medium stores program code, and the program code may be used to instruct to perform the method in the first aspect or any optional implementation of the first aspect.

According to an eleventh aspect, a computer storage medium is provided. The computer storage medium stores program code, and the program code may be used to instruct to perform the method in the second aspect or any optional implementation of the second aspect.

According to a twelfth aspect, a computer storage medium is provided. The computer storage medium stores program code, and the program code may be used to instruct to perform the method in the third aspect or any optional implementation of the third aspect.

DESCRIPTION OF DRAWINGS

FIG. 1 is a schematic diagram of a communications system including a wireless communication method, a control device, a node, and a terminal device according to this application;

FIG. 2 is a schematic flowchart of a wireless communication method according to this application;

FIG. 6 is a schematic diagram of a downlink transmission delay from a node to a terminal device according to this application;

FIG. 7 is a schematic flowchart of a wireless communication method according to this application;

FIG. 12 is a schematic diagram of an activated node in a spatial beam grid according to this application;

FIG. 13 is a schematic flowchart of a wireless communication method according to this application;

FIG. 14 is a schematic block diagram of a control device according to this application;

DESCRIPTION OF EMBODIMENTS

Figure 3:
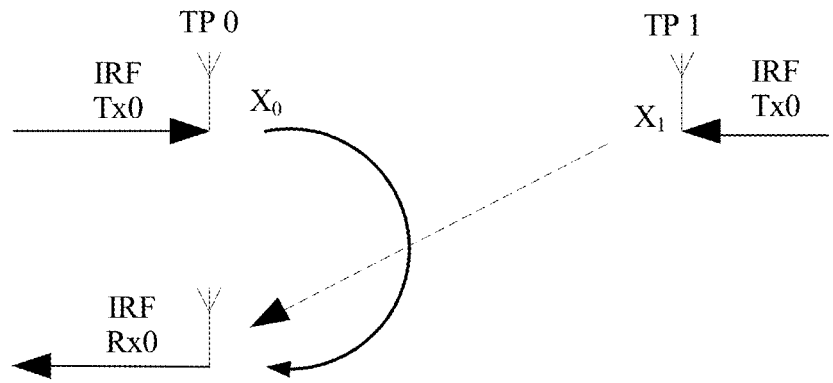
FIG. 3 is a schematic diagram of transmitting a correction signal between nodes according to this application.

The following describes technical solutions of this application with reference to the accompanying drawings.

FIG. 1 is a schematic diagram of a communications system including a method, a control device, a node, and a terminal device that are used for coordinated multipoint wireless communications according to this application. As shown in FIG. 1, the communications system 100 includes a network device 102 and a network device 122. The network device 102 may include a plurality of antennas such as antennas 104, 106, 108, 110, 112, and 114. The network device 122 may include a plurality of antennas such as antennas 124, 126, 128, 130, 132, and 134. In addition, the network device 102 and the network device 122 each may additionally include a transmitter chain and a receiver chain. A person of ordinary skill in the art may understand that the transmitter chain and the receiver chain may include a plurality of components (for example, a processor, a modulator, a multiplexer, a demodulator, a demultiplexer, or an antenna) related to signal sending and receiving.

The network devices 102 and 122 may communicate with a plurality of terminal devices. It may be understood that the network devices 102 and 122 may communicate with any quantity of target terminal devices similar to a terminal device 116.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 116 communicates with the antennas 124 and 126. The antennas 124 and 126 send information to the terminal device 116 over a forward link 136, and receive information from the terminal device 116 over a reverse link 138.

Within a given time, the network device 102, the network device 122, or the terminal device 116 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of target data bits that need to be sent to the wireless communications receiving apparatus through a channel. The data bits may be included in a data transport block (or a plurality of transport blocks), and the transport block may be segmented to generate a plurality of code blocks.

In addition, the communications system 100 may be a public land mobile network (PLMN) or another network. FIG. 1 is merely a simplified schematic diagram of an example. The network may further include another network device that is not shown in FIG. 1.

Optionally, in the embodiments of this application, the network device may be a device that communicates with a terminal device, for example, a base station or a base station controller. Each network device may provide communication coverage for a specific geographical area, and may communicate with a terminal device (for example, UE) located in the coverage area. The network device may support communications protocols of different standards, or may support different communication modes. For example, the network device may be a base transceiver station (BTS) in a global system for mobile communications (GSM) or a code division multiple access (CDMA) system, a NodeB (NB) in a wideband code division multiple access system, an evolved NodeB (eNB or eNodeB) in a long term evolution system, or a radio controller in a cloud radio access network (CRAN). Alternatively, the network device may be a network device in a future 5G network, a network device in a future evolved public land mobile network (PLMN), or the like.

Optionally, in the embodiments of this application, the terminal device may be an access terminal, a terminal device (User Equipment, UE), a terminal unit, a terminal station, a mobile station, a mobile console, a remote station, a remote terminal, a mobile terminal, a terminal, a wireless communications device, a terminal agent, or a terminal apparatus. The access terminal may be a cellular phone, a cordless phone, a session initiation protocol (SIP) phone, a wireless local loop (WLL) station, a personal digital assistant (PDA), a handheld device having a wireless communications function, a computing device, another processing device connected to a wireless modem, an in-vehicle device, a wearable device, a terminal device in internet of things, a virtual reality device, a terminal device in the future 5G network, a terminal device in the future evolved public land mobile network (PLMN), or the like.

The wireless communication method and the device provided in the embodiments of this application may be applied to a terminal device. The terminal includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that process a service by using a process, for example, a Linux operating system, a Unix operating system, an Android operating system, an iOS operating system, or a Windows operating system. The application layer includes applications such as a browser, an address book, word processing software, and instant messaging software.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to a magnetic storage device (for example, a hard disk, a floppy disk, or a magnetic tape), an optical disc (for example, a compact disc (CD), a digital versatile disc (DVD)), a smart card, and a flash storage device (for example, an erasable programmable read-only memory (EPROM), a card, a stick, or a key drive)). In addition, various storage media described in this specification may indicate one or more devices and/or other machine-readable media that are configured to store information. The term "machine-readable media" may include but are not limited to various media that can store, contain and/or carry an instruction and/or data.

To better understand this application, this application is described below with reference to FIG. 2 to FIG. 18 by using a system the same as or similar to the system shown in FIG. 1 as an example.

FIG. 2 is a schematic flowchart of a wireless communication method 200 according to this application. The method is used in a coordinated multipoint system that includes a plurality of nodes. As shown in FIG. 2, the method 200 includes the following content.

Step 210: Predict a first delay difference between receiving, by a terminal device, downlink data from a beam A of a first node and receiving, by the terminal device, the downlink data from a beam B of a second node, where the terminal device is located in a coverage area in which the beam A intersects with the beam B.

Optionally, the predicting a first delay difference between receiving, by a terminal device, downlink data from a beam A of a first node and receiving, by the terminal device, the downlink data from a beam B of a second node includes: obtaining a second delay difference between receiving, by the terminal device, a downlink pilot signal from the beam A of the first node and receiving, by the terminal device, a downlink pilot signal from the beam B of the second node; and predicting the first delay difference based on the second delay difference.

Specifically, the terminal device determines, based on a time of receiving the downlink pilot signal from the beam A of the first node and a time of receiving the downlink pilot signal from the beam B of the second node, the second delay difference between receiving, by the terminal device, the downlink pilot signal from the beam A of the first node and receiving, by the terminal device, the downlink pilot signal from the beam B of the second node, and the first terminal device sends the second delay difference to a control device. The control device estimates the first delay difference based on the second delay difference.

The terminal device uses the second node as a reference node, and the terminal device calculates a difference between the time of receiving the downlink pilot signal from the beam A of the first node and the time of receiving the downlink pilot signal from the beam B of the second node, and determines the difference as the second delay difference.

It should be understood that the terminal device may send, to the control device, the time of receiving, by the terminal device, the downlink pilot signal from the beam A of the first node and the time of receiving, by the terminal device, the downlink pilot signal from the beam B of the second node. The control device determines, based on the receiving times sent by the first terminal device, the second delay difference between receiving, by the terminal device, the downlink pilot signal from the beam A of the first node and receiving, by the terminal device, the downlink pilot signal from the beam B of the second node, and the control device estimates the first delay difference based on the second delay difference.

It should be further understood that the control device may be either the first node or the second node. A primary node and a secondary node are determined in the first node and the second node. In addition to sending a signal to the terminal device, the primary node is further configured to control the plurality of nodes to adjust a downlink data transmission time.

Optionally, the predicting, by a control device, a first delay difference between receiving, by a terminal device, downlink data from a beam A of a first node and receiving, by the terminal device, the downlink data from a beam B of a second node includes: when a plurality of first terminal devices that perform frequency division multiplexing are in the coverage area in which the terminal device is located and in which the beam A of the first node intersects with the beam B of the second node, obtaining second delay differences of the plurality of first terminal devices that perform frequency division multiplexing, and estimating the first delay difference based on an average value of the second delay differences.

Specifically, at a high frequency and in a massive antenna array, terminal devices that belong to a same beam node and that perform frequency division multiplexing are similar in spatial locations, and inter-TP air interface transmission delay features and inter-TP delay differences (including IRF timing errors) of the terminal devices are also similar. Therefore, the first delay difference may be estimated based on an average value of the inter-TP delay differences fed back by the terminal devices.

Optionally, the obtaining a second delay difference between receiving, by the terminal device, a downlink pilot signal from the beam A of the first node and receiving, by the terminal device, a downlink pilot signal from the beam B of the second node includes: obtaining the second delay difference between sending, by the terminal device, the downlink pilot signal to the terminal device on a first path of the beam A of the first node and sending, by the second node, the downlink pilot signal to the terminal device on a first path of the beam B. The first path is usually a line of sight (LOS) path. When there is no line of sight path on the beam A, the first path is a non-line of sight (NLOS) path with a shortest transmission distance.

Optionally, before the first node transmits the downlink data to the terminal device by using the beam A and the second node transmits the downlink data to the terminal device by using the beam B, the downlink pilot signal is a cell-level pilot signal.

Specifically, when the first terminal device receives a cell-level pilot signal from the first node and a cell-level pilot signal from the second node, for example, the cell-level pilot signals are synchronization shift (SS) signals, the first terminal device determines the second delay difference based on pilot signals, namely, SSs, from the first node and the second node, and the first terminal device sends the second delay difference to the control device. The control device receives the second delay difference sent by the first terminal device, and predicts, based on the second delay difference, the first delay difference between receiving, by the terminal device, the downlink data from the beam A of the first node and receiving, by the terminal device, the downlink data from the beam B of the second node. The first delay difference is used as a timing adjustment to an initial state of the transmitted downlink data.

In this case, the first delay difference is determined based on the second delay difference between receiving, by the terminal device, the cell-level pilot signal from the beam A of the first node and receiving, by the terminal device, the cell-level pilot signal from the beam B of the second node. Therefore, before the downlink data is transmitted, a first adjustment time period used for sending, by the first node, the downlink data to the first terminal device is determined based on the first delay difference, so that a delay difference between receiving, by the terminal device, the downlink data from the beam A and receiving, by the terminal device, the downlink data from the beam B is less than a predetermined value. Optionally, in an implementation of the first aspect, when the first node transmits the downlink data to the terminal device by using the beam A and the second node transmits the downlink data to the terminal device by using the beam B, the downlink pilot signal is a user-level pilot signal.

Specifically, when the first terminal device receives a user-level pilot signal from the first node and a user-level pilot signal from the second node, for example, the user-level pilot signal is a measurement pilot (channel state indication reference signal, CSI), the first terminal device determines the second delay difference based on measurement pilot signals, namely, CSIs, from the plurality of nodes, and the first terminal device sends the second delay difference to the control device. The control device receives the second delay difference sent by the first terminal device, and predicts, based on the second delay difference, the first delay difference between receiving, by the terminal device, the downlink data from the beam A of the first node and receiving, by the terminal device, the downlink data from the beam B of the second node. The first delay difference is used as a timing adjustment to a tracking state of the downlink data.

In this case, the first delay difference is determined based on the second delay difference between receiving, by the terminal device, the user-level pilot signal from the beam A of the first node and receiving, by the terminal device, the user-level pilot signal from the beam B of the second node. Therefore, when the downlink data is transmitted, a first adjustment time period used for sending, by the first node, the downlink data to the first terminal device is determined based on the first delay difference, so that a delay difference between receiving, by the terminal device, the downlink data from the beam A and receiving, by the terminal device, the downlink data from the beam B is less than a predetermined value.

Optionally, the cell-level pilot signal or the user-level pilot signal or both are decoupled, and time division transmission may be performed on the cell-level pilot signal and/or the user-level pilot signal by using different subframes.

Specifically, the cell-level pilot signal is a common reference signal of all terminal devices in a cell, and the control device needs to estimate first delay differences of all the terminal devices in the cell in an initial transmission phase of the downlink data based on the cell-level pilot signal. Therefore, a timing pre-adjustment at a transmit end is not suitable for the cell-level pilot signal, to be specific, the cell-level pilot signal needs to be decoupled from the user-level pilot signal, to ensure that a timing pre-adjustment to the user-level pilot signal does not affect transmission of the cell-level pilot signal. For example, time division transmission is performed on the cell-level pilot signal and the user-level pilot signal by using different subframes, the cell-level pilot signals are transmitted in a single subframe together, and no data signal is transmitted in the cell-level pilot subframe.

Optionally, the predicting a first delay difference between receiving, by a terminal device, downlink data from a beam A of a first node and receiving, by the terminal device, the downlink data from a beam B of a second node includes: obtaining a third delay difference between receiving, by the first node by using the beam A, an uplink reference signal transmitted by the first terminal device and receiving, by the second node by using the beam B, an uplink reference signal transmitted by the first terminal device; and predicting the first delay difference based on the third delay difference.

Specifically, when receiving an uplink pilot signal sent by the first terminal device, for example, the uplink pilot signal is an uplink reference signal (Sounding Reference Signals, SRS), the first node and the second node send moments at which the uplink pilot signal, namely, the SRS, is received to the control device. The control device receives the moments at which the uplink pilot signal, namely, the SRS, is received and that are sent by the first node and the second node; calculates, by using the second node as a reference node, a difference between times of receiving the uplink pilot signal, namely, the SRS, by the first node and the second node, where the time difference is the third delay difference; and estimates the first delay difference based on the third delay difference.

Optionally, the method further includes: controlling the first node and the second node to simultaneously transmit correction signals in an uplink/downlink switching guard period; obtaining a time in which the first node receives a correction signal sent by the second node and a time in which the second node receives a correction signal sent by the first node; and determining a fourth delay difference between an intermediate radio frequency channel of the first node and an intermediate radio frequency channel of the second node based on the time in which the first node receives the correction signal sent by the second node and the time in which the second node receives the correction signal sent by the first node; and the predicting the first delay difference based on the third delay difference includes:

predicting the first delay difference based on the third delay difference and the fourth delay difference.

Specifically, transmission delays of a node include an IRF intermediate radio frequency channel delay and an air interface transmission delay. The control device separately estimates IRF intermediate radio frequency channel delays and uplink air interface transmission delays of the first node and the second node, and estimates, based on the IRF intermediate radio frequency channel delays and the uplink air interface transmission delays, a delay of transmitting, by the first node, the downlink data to the first terminal device by using a first transmit beam of the first node and a delay of transmitting, by the second node, the downlink data to the first terminal device by using a first transmit beam of the second node. First, the control device estimates an uplink/downlink IRF channel delay difference between the first node and the second node by using correction signals between the first node and the second node. For example, the first node and the second node transmit correction signals in a time division duplexing (TDD) uplink/downlink switching guard period (GP), and the correction signal is in a form of an orthogonal sequence to reduce mutual interference. Each coordinated TP selects an orthogonal sequence corresponding to a target signal from received correction signals, and estimates a first path delay difference between the first node and the second node by using a method such as correlation peak detection and multi-frame filtering. The control device estimates the uplink/downlink IRF channel delay difference between the first node and the second node based on the first path delay difference between the first node and the second node. Second, the control device determines an uplink transmission delay difference between the first node and the second node based on the uplink transmission delay difference between receiving, by the first node, the uplink reference signal sent by the first terminal device and receiving, by the second node, the uplink reference signal sent by the first terminal device. Third, a downlink transmission delay difference between the first node and the second node is determined based on the IRF channel delay and the inter-TP uplink transmission delay difference between the first node and the second node.

Figure 4:
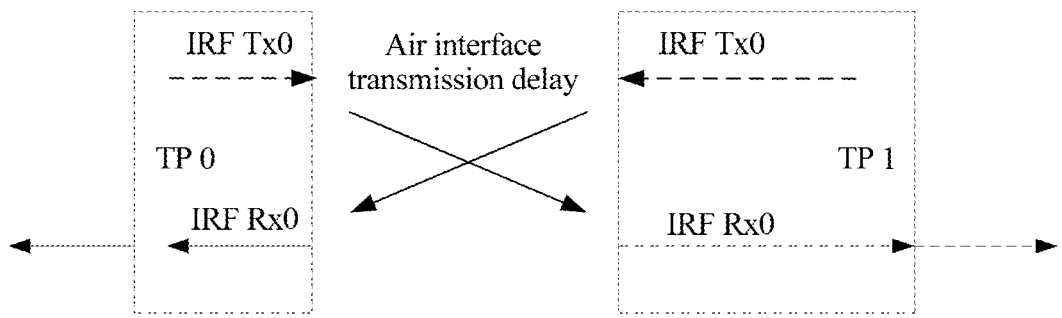
FIG. 4 is a schematic diagram of an intermediate radio frequency channel transmission delay between nodes according to this application.

For example, in FIG. 3, a node TP 0 and a node TP 1 are coordinated nodes. The node TP 0 is a primary node, and may function as the control device. The node TP 0 and the node TP 1 transmit correction signals in a TDD uplink/downlink switching guard period (GP). The node TP 0 receives a correction signal transmitted by the node TP 0 and a correction signal transmitted by the node TP 1. The node TP 0 determines an orthogonal sequence corresponding to a target signal (which is referred to as the correction signal from the node 1 herein) from the received correction signals. As shown in FIG. 4, the node TP 0 and the node TP 1 send correction signals to each other in a TDD uplink/downlink switching GP period. The TP 0 selects, from received correction signals, an orthogonal sequence corresponding to a target signal sent by the TP 1, and estimates a first path delay difference between the TPs by using a method such as correlation peak detection and multi-frame filtering. The TP 1 selects, from received correction signals, an orthogonal sequence corresponding to a target signal sent by the TP 0, estimates a first path delay difference between the TPs by using a method such as correlation peak detection and multi-frame filtering, and sends the first path transmission delay to the TP 0. Because the first path transmission delays are equal, the TP 0 estimates an uplink/downlink IRF channel delay difference between the TP 0 and the TP 1 based on the first path delay.

Figure 5:
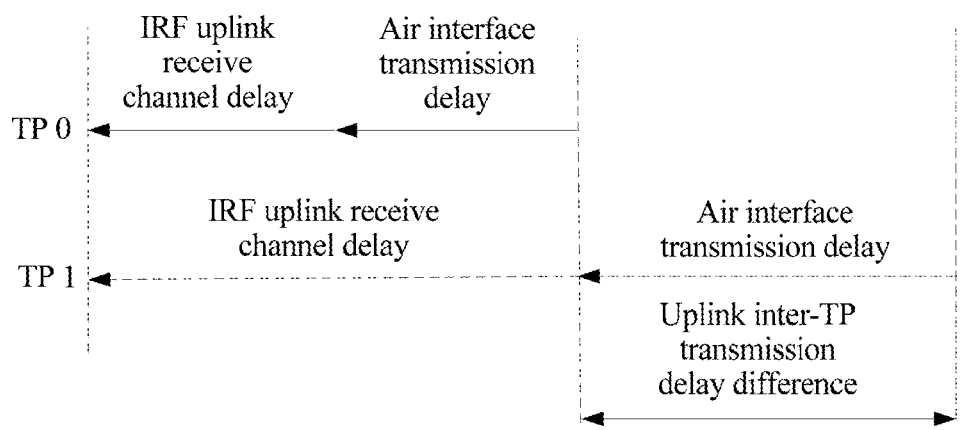
FIG. 5 is a schematic diagram of an uplink transmission delay from a terminal device to a node according to this application.

FIG. 5 shows an uplink transmission delay difference between the TP 0 and the TP 1 in receiving the uplink reference signal sent by the first terminal device. The TP 1 sends, to the TP 0, the uplink transmission delay in receiving the uplink reference signal sent by the first terminal device.

FIG. 6 shows a transmission delay difference between the TP 0 and the TP1 in sending downlink data to the first terminal device. The TP 0 estimates, based on the uplink/downlink IRF channel delay difference between the TP 0 and the TP 1 and the uplink transmission delay difference between the TP 0 and the TP 1 in receiving the uplink reference signal sent by the first terminal device, the downlink transmission delay difference between the TP 0 and the TP 1 in sending the downlink data to the first terminal device.

It should be understood that the node TP 0 and the node TP 1 are merely examples, and constitute no limitation on this application. An intermediate radio frequency channel delay difference between a plurality of nodes and a transmission delay difference between the plurality of nodes may also be determined according to a similar method.

Step 220: Determine a first adjustment time period based on the first delay difference, where the first adjustment time period is used to adjust a transmission time in which the first node transmits the downlink data to the terminal device by using the beam A, so that a delay difference between receiving, by the terminal device, the downlink data from the beam A and receiving, by the terminal device, the downlink data from the beam B is less than a predetermined value.

Optionally, the control device sends the first adjustment time period to the first node, so that the first node sends the downlink data to the first terminal device by using the beam A based on the first adjustment time period.

Optionally, when the control device is the first node, the control device may send the downlink data to the first terminal device by using the beam A based on the first adjustment time period. When the first adjustment time period is greater than 0, zero padding is performed on at least two subframes for transmitting the downlink data, where the time period on which null padding is performed is equal to the first adjustment time period. Alternatively, when the first adjustment time period is less than 0, null padding is performed on a cyclic prefix part of at least one subframe for transmitting the downlink data, where a transmission time of a part on which null padding is performed and that is of the cyclic prefix part of the at least one subframe is equal to an absolute value of the adjustment time period.

It should be understood that in this embodiment of this application, there may be a plurality of first nodes, and the second node is a reference node. The first node is merely used as an example, and constitutes no limitation on this application.

Therefore, in this embodiment of this application, the first delay difference between receiving, by the terminal device, the downlink data from the beam A of the first node and receiving, by the terminal device, the downlink data from the beam B of the second node is predicted, and the transmission time in which the first node sends the downlink data to the terminal device by using the beam A is determined based on the first delay difference, to implement a beam-level signal transmission pre-adjustment on a node side. As a result, a delay difference between arrival, at the first terminal device, of the downlink data sent by the first node to the first terminal device and arrival, at the first terminal device, of the downlink data sent by the second node to the first terminal device is less than the predetermined value. This resolves an ISI interference problem and a coordinated area shrinkage problem that are introduced due to an inter-TP air interface transmission delay difference and an inter-TP IRF timing error in a coordinated technology, thereby effectively increasing a coordinated area and a coordinated gain particularly in a scenario of a shorter CP in a 5G high-frequency system.

FIG. 7 is a schematic flowchart of a wireless communication method 300 according to this application. The method 300 is used in a coordinated multipoint system that includes a plurality of nodes. As shown in FIG. 7, the method 300 includes the following content.

Step 310: A first node obtains a first adjustment time period, where the first adjustment time period is used to adjust a transmission time in which the first node transmits downlink data to a terminal device by using a beam A, and the terminal device is located in a coverage area in which the beam A of the first node intersects with a beam B of a second node.

Step 320: The first node determines, based on the first adjustment time period, the transmission time in which the downlink data is transmitted to the terminal device by using the beam A.

Optionally, that the first node determines, based on the first adjustment time period, the transmission time in which the downlink data is transmitted to the first terminal device by using the beam A includes: when the first adjustment time period is greater than 0, performing zero padding on at least two subframes for transmitting the downlink data, where the time period on which null padding is performed is equal to the adjustment time period; or when the first adjustment time period is less than 0, performing null padding on a cyclic prefix part of at least one subframe for transmitting the downlink data, where a transmission time of a part on which null padding is performed and that is of the cyclic prefix part of the at least one subframe is equal to an absolute value of the adjustment time period.

Figure 8:
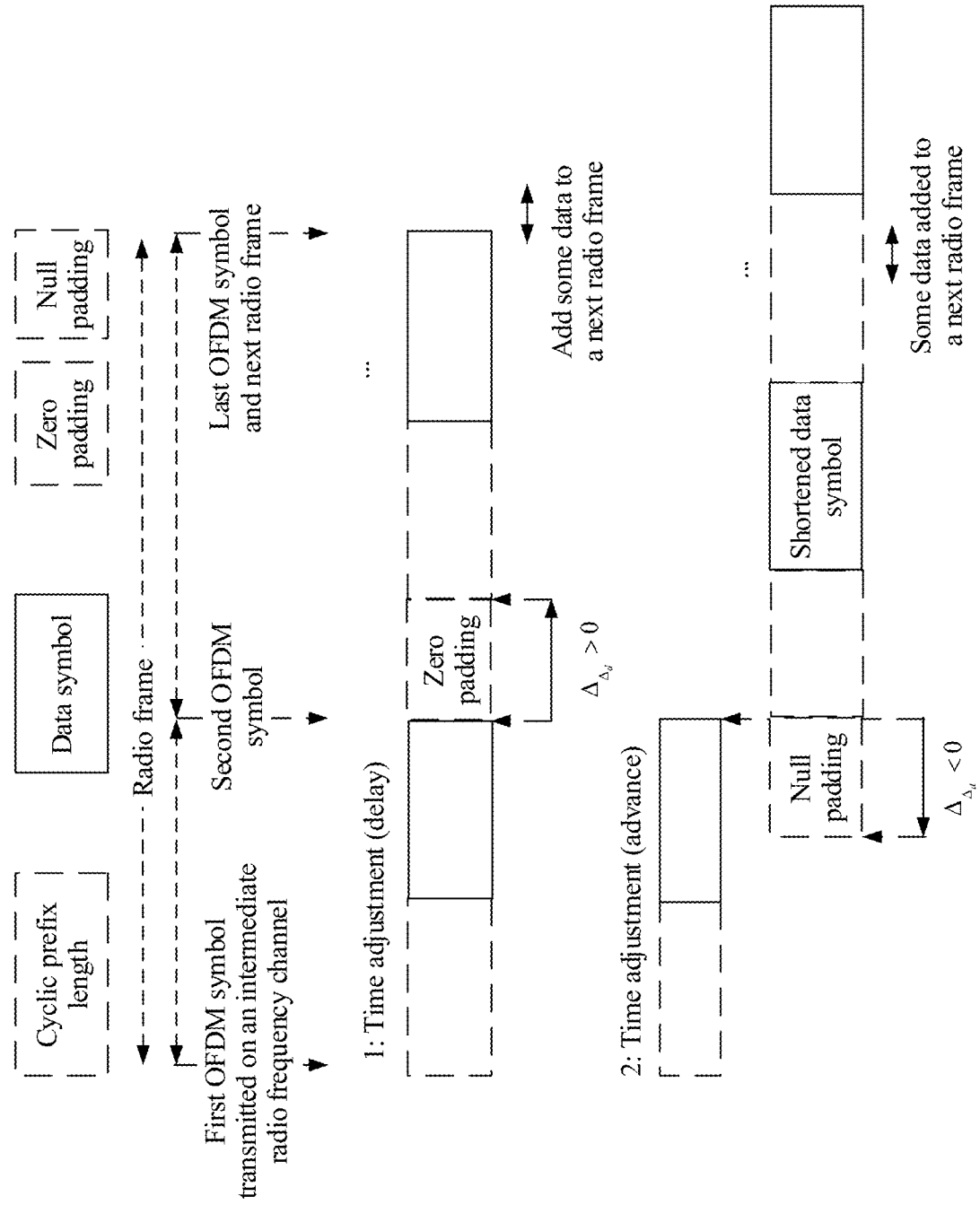
FIG. 8 is a schematic diagram of adjusting a data transmission time by a node according to this application.

Specifically, the node receives the first adjustment time period sent by the control device, and adjusts a transmit signal on the beam A based on the first adjustment time period. In principle, this may be implemented by adjusting a physical transmission time of an OFDM-symbol-level signal. However, the method is relatively complex, and typically, a signal is usually transmitted on an IRF interface on a frame basis. One radio frame includes 10 subframes and 20 timeslots, and each downlink timeslot is further divided into several OFDM symbols. A quantity of included OFDM symbols varies with a CP length. When a normal CP is used, one downlink timeslot includes seven OFDM symbols. When an extended CP is used, one downlink timeslot includes six OFDM symbols. To match an existing IRF interface, a framing method on a baseband side is shown in FIG. 8. It may be learned from FIG. 8 that a subframe with a timing pre-adjustment effect may be formed by partially concatenating two original adjacent subframe (or radio frame) signals. When the first adjustment time period $\Delta_{A^d}$ received by the node is greater than 0, the time in which the node sends the downlink data is delayed by the first adjustment time period, and zero padding may be performed on two adjacent subframes, where a time period on which zero padding is performed is equal to the first adjustment time period. As shown in FIG. 8, when the first adjustment time period $\Delta_{A^d}$ received by the node is greater than 0, zero padding is performed after the first subframe. When the first adjustment time period $\Delta_A{}^d$ received by the node is less than 0, the time in which the node sends the downlink data is advanced by the first adjustment time period, and null padding may be performed on a part of a cyclic prefix part of at least one subframe for transmitting the downlink data, where a transmission time of the part that is of the cyclic prefix part of the at least one subframe and on which null padding is performed is equal to an absolute value of the adjustment time period. As shown in FIG. 8, when the first adjustment time period $\Delta_A{}^d$ received by the node is less than 0, null padding is not performed on a CP part of the second subframe.

In this case, zero padding is performed on the at least two adjacent subframes or null padding is performed on the cyclic prefix part of the at least one subframe based on the first adjustment time period, to achieve a timing pre-adjustment effect on the downlink data, thereby avoiding complexity of adjusting a physical transmission time at an OFDM symbol level.

Optionally, when another terminal device that performs time division multiplexing with the terminal device is on the beam A, that the first node determines, based on the first adjustment time period, the transmission time in which the downlink data is transmitted to the terminal device by using the beam A further includes: determining, at a moment of a switchover between the terminal device and the another terminal device, whether there is intersymbol interference between the terminal device and the another terminal device; and if there is intersymbol interference between the terminal device and the another terminal device, a time interval is reserved at the moment of the switchover between the terminal device and the another terminal device.

Specifically, when a plurality of terminal devices that perform time division multiplexing are on the beam A, the plurality of terminal devices that perform time division multiplexing may perform time division multiplexing on one node using the beam A, or may perform time division multiplexing on different nodes using the beam A. At a transmit moment switching point of each two of the plurality of terminal devices that perform time division multiplexing, intersymbol interference in two adjacent transmissions is determined based on a positive or negative value of a first delay difference between the two terminal devices. If there is intersymbol interference, the node reserves a specific interval at a moment of a switchover between the two terminal devices, for example, reserves one reserved time interval TTI.

In this case, the time interval is reserved at the moment of the switchover between the terminal device and the another terminal device that are on the transmit beam A and that perform time division multiplexing, thereby effectively avoiding intersymbol interference between the terminal device and the another terminal device.

Optionally, the method further includes: obtaining a second adjustment time period, where the second adjustment time period is used to adjust a transmission time in which the first node transmits a user-level pilot signal to the terminal device by using the beam A; determining, by the first node based on the second adjustment time period, the transmission time in which the user-level pilot signal is transmitted to the terminal device by using the beam A; and sending, by the first node, the user-level pilot signal to the terminal device by using the beam A.

Specifically, in a continuous transmission phase of the data, the first node adjusts the transmission time of the downlink data based on the first adjustment time period. Because the user-level pilot signal is sent at a time interval of sending the downlink data, the user-level pilot signal from the node is also adjusted based on the first adjustment time period.

Optionally, before the first node obtains the first adjustment time period, the method further includes: determining the beam A corresponding to the node based on beam measurement information sent by the terminal device and/or information about whether a plurality of terminal devices that perform time division multiplexing or frequency division multiplexing are on a plurality of transmit beams of the node, where the beam measurement information is used to indicate measurement information of the plurality of transmit beams of the node that are measured by the terminal device.

Optionally, the beam measurement information includes at least one type of the following information: beam spectral efficiency, a beam signal-to-noise ratio, and a beam throughput. The determining the beam A corresponding to the node based on beam measurement information sent by the first terminal device and/or information about whether a plurality of terminal devices that perform time division multiplexing or frequency division multiplexing are on a plurality of transmit beams of the node includes: selecting at least one transmit beam from the plurality of transmit beams based on the beam measurement information; and determining the beam A from the at least one selected beam. No other terminal devices that perform frequency division multiplexing with the terminal device are on a beam A outside the coverage area in which the terminal device is located, and the coverage area is a coverage area in which the first terminal device is located and in which the beam A intersects with the beam B.

Specifically, for a massive array antenna of a plurality of nodes, a plurality of beams with relatively good orthogonality or spatial isolation (which may be physically represented as specific forms such as adaptive beamforming ABF beams or subarrays) are formed by using a technology such as static weighting or ABF, and the plurality of beams are spatially interleaved to form a beam grid node Lattice. The first terminal device scans and measures beams of a plurality of coordinated TPs, to obtain an optimal beam of each TP, where the optimal beam is used as a first transmit beam. A node at which the first transmit beams of the plurality of coordinated TPs intersect is a node of the terminal in the beam grid.

Figure 9:
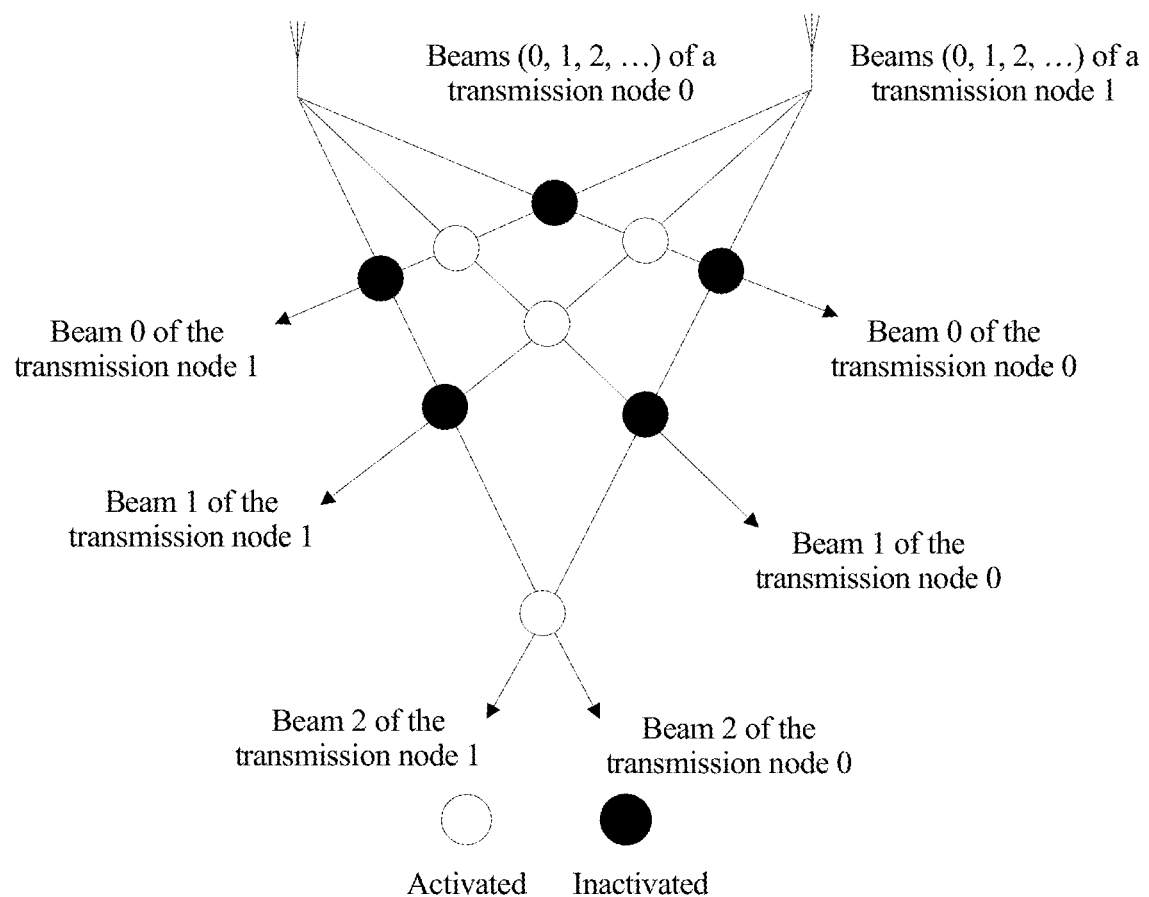
FIG. 9 is a schematic diagram of a spatial beam grid according to this application.

For example, in FIG. 9, beams of a node TP 0 and a node TP 1 form a spatial beam grid. The beams of the node TP 0 are a beam 0 of the TP 0, a beam 1 of the TP 0, and a beam 2 of the TP 0, and the beams of the node TP 1 are a beam 0 of the TP 1, a beam 1 of the TP 1, and a beam 2 of the TP 1. The beams of the TP 0 and the TP 1 are interleaved to form the spatial beam grid, a quantity of nodes formed by using the TP 0 and the TP 1 is 9, and (m,n) is defined as a node formed by an $m^{th}$ beam of the TP 0 and an $n^{th}$ beam of the TP 1 through interleaving. For a $k^{th}$ terminal, a home lattice node of the $k^{th}$ terminal and a measured value of coordinated spectral efficiency, marked as $c_{m,n,k}$, of the $k^{th}$ terminal may be obtained by scanning and measuring beams of coordinated TPs on a downlink receiving side.

A method for measuring the coordinated spectral efficiency $c_{m,n,k}$ depends on a specific coordinated solution and a measurement and feedback method. Several example methods are as follows:

Method 1: The $k^{th}$ terminal device measures and reflects a spectral efficiency estimation value, marked as $c_{0,m,k}$ (which may be converted by using a signal CQI or the like) of the $m^{th}$ beam of the TP0, and selects a largest value $c_{0,\bar{m},k}$ from a set $\{c_{0,m,k}\}_m$ measured values of the beams of the TP 0, and similarly, the $k^{th}$ terminal device measures and reflects a spectral efficiency estimation value $c_{1,n,k}$ of the $n^{th}$ beam of the TP 1, and selects a largest value $c_{1,\tilde{n},k}$ from a set $\{c_{1,n,k}\}_n$ of measured values of the beams of the TP 1, to determine the home beam lattice node $(\tilde{m},\tilde{n})$ and the spectral efficiency $c_{\tilde{m},\tilde{n},k}=c_{0,\tilde{m},k}+c_{1,\tilde{n},k}$ that are corresponding to the terminal device. It should be noted that the spectral efficiency estimation method cannot reflect impact of mutual interference between beams.

Method 2: The $k^{th}$ terminal device performs joint measurement on the $m^{th}$ beam of the TP 0 and the $n^{th}$ beam of the TP 1, to obtain overall spectral efficiency $c_{m,n,k}$ under a condition that mutual interference between beams can be sensed, and selects a largest value $c_{\tilde{m},\tilde{n},\tilde{k}}$ from a set $\{c_{m,n,k}\}_{m,n}$, to determine the home beam lattice node corresponding to the terminal.

For a specific lattice node (m,n), there may be a plurality of terminal devices. From a perspective of maximum spectral efficiency, a terminal with the maximum spectral efficiency is selected as the first terminal device from a set $\{C_{m,n,k}\}_k$.

It may be learned from FIG. 9 that a one-dimensional overlapping degree or a two-dimensional overlapping degree of a node in the grid that is selected based on a coordinated spectral efficiency measured by the terminal device may be greater than 0. That a one-dimensional overlapping degree is greater than 0 means that there are a plurality of worker nodes using a beam used by a node in the spatial beam grid, and that a two-dimensional overlapping degree is greater than 0 means that there are a plurality of worker nodes using two beams that intersect at a node in the spatial beam grid. As shown in FIG. 9, a one-dimensional overlapping degree of the first node using the beam 1 of the TP 0 is greater than 0, and a two-dimensional overlapping degree of the second node using the beam 1 of the TP 0 is greater than 0. If no timing pre-adjustment is made to the node TP 0, and orthogonality between beams is relatively good, nodes in each spatial beam grid independently perform coordinated transmission, in other words, overlapping between the nodes in the spatial beam grid does not affect another terminal device. However, if a timing pre-adjustment is made to the node TP 0, the timing pre-adjustment affects all terminal devices that perform multiplexing on the node TP 0. Different air interface transmission delay differences are introduced because different terminal devices in different nodes using a same beam have different spatial locations. Air interface transmission delay timing adjustment values are usually different because terminal devices in each node have different locations. Therefore, an adjustment of a timing adjustment to the beam 1 of the TP 0 causes an error on a different node using the beam 1 of the TP 0. In addition, the first node using the beam 1 of the TP 0 is located at an intersecting point of the beam 1 of the TP 0 and the beam 0 of the TP 1, and the second node using the beam 1 of the TP 0 is located at an intersecting point of the beam 1 of the TP 0 and the beam 1 of the TP 1. Therefore, the beam 1 of the TP 0 has two adjustment values: an adjustment value for the beam 0 of the TP 1 and an adjustment value for the beam 1 of the TP 1.

Figure 10:
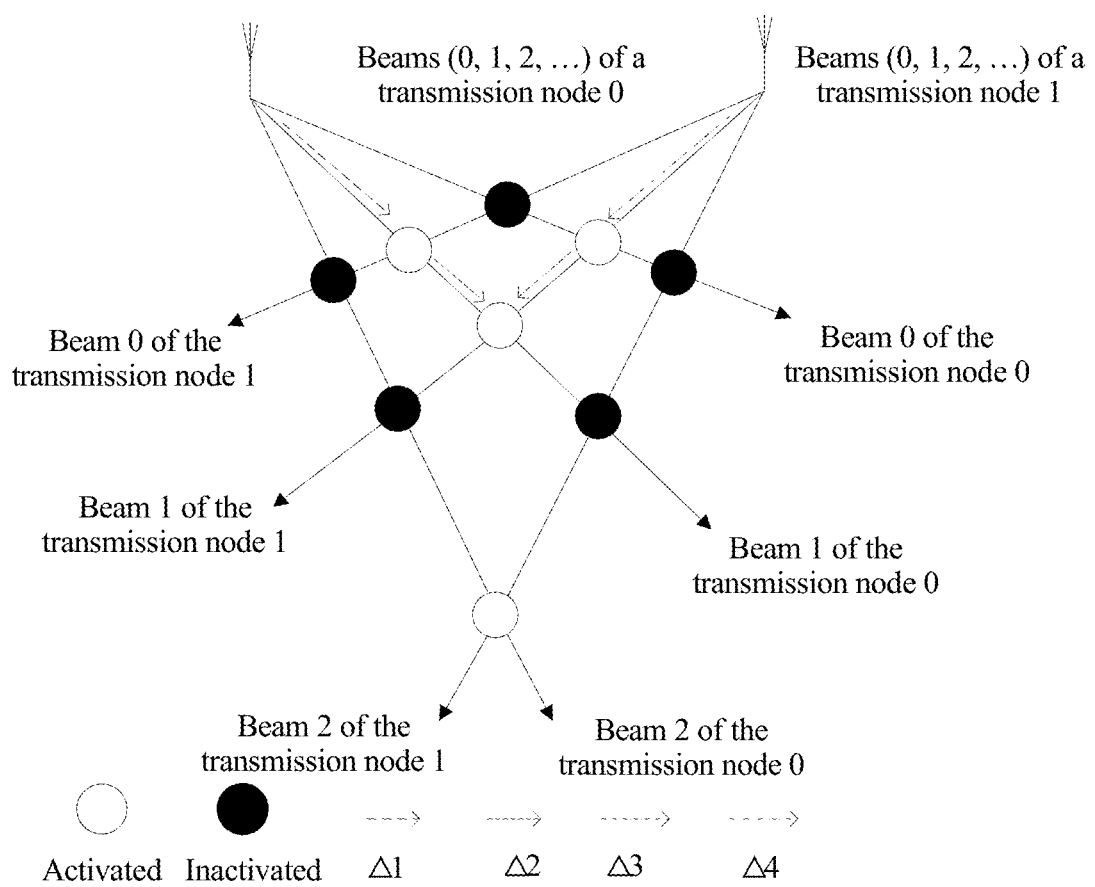
FIG. 10 is a schematic diagram of adjusting a downlink data transmission time according to this application.

As shown in FIG. 10, there is a relatively large distance between spatial locations of two nodes using the beam 1 of the TP 0, and an adjustment time $\Delta 1$ is not equal to $\Delta 2$. If a timing pre-adjustment is made to downlink data from a terminal device in the first node using the beam 1 of the TP 0 based on the adjustment time $\Delta 1$, receiving downlink data from a terminal device in the second node is affected. Similarly, there is a relatively large distance between spatial locations of two nodes using the beam 1 of the TP 1, and an adjustment time $\Delta 3$ is not equal to $\Delta 4$. If a timing pre-adjustment is made to downlink data from a terminal device in the first node using the beam 1 of the TP 1 based on the adjustment time $\Delta 3$, receiving downlink data from a terminal device in the second node is affected. Therefore, the nodes in the spatial beam grid need to be independent to some extent.

With reference to the foregoing condition, the nodes in the spatial beam grid formed by the beams of the TP 0 and the TP 1 are defined as a matrix A.

A constraint condition and a physical meaning of the matrix A are as follows:

(1) A value of any element is 0 or 1, and this is corresponding to an activated or inactivated node.

(2) A two-dimensional overlapping degree $b_{m,n}$ of any element or node, needs to be equal to 0, to be specific, for any node, a row vector or a column vector in which the node is located cannot simultaneously include a plurality of activated nodes, to ensure two-dimensional decoupling or independence between nodes.

Generally, terminal devices in nodes in a same row or column need to perform frequency division multiplexing or time division multiplexing. From a perspective of maximum spectral efficiency at a TTI level, a single node with the maximum spectral efficiency is usually selected for data transmission. To be specific, to activate the matrix A, a constraint that any row vector or column vector includes only one non-zero element needs to be met. It should be noted that the condition is not required for coordination and a timing pre-adjustment at a transmit end, but is required based on a feature of a beam multiplexing MIMO transmission scheme, and also needs to be met for a single cell.

In this embodiment of this application, a method for activating the node in the spatial beam grid formed by the coordinated TPs is provided. In the method, on a beam, a node in which a terminal device with maximum spectral efficiency is located is selected for activation, extension is performed in a cross manner by using the node as an origin, to determine other nodes associated with the node, and these nodes are kept empty, to ensure that any two activated nodes do not overlap, so that beam-level transmission timing pre-adjustments are mutually decoupled, and may be separately made.

Figure 11:
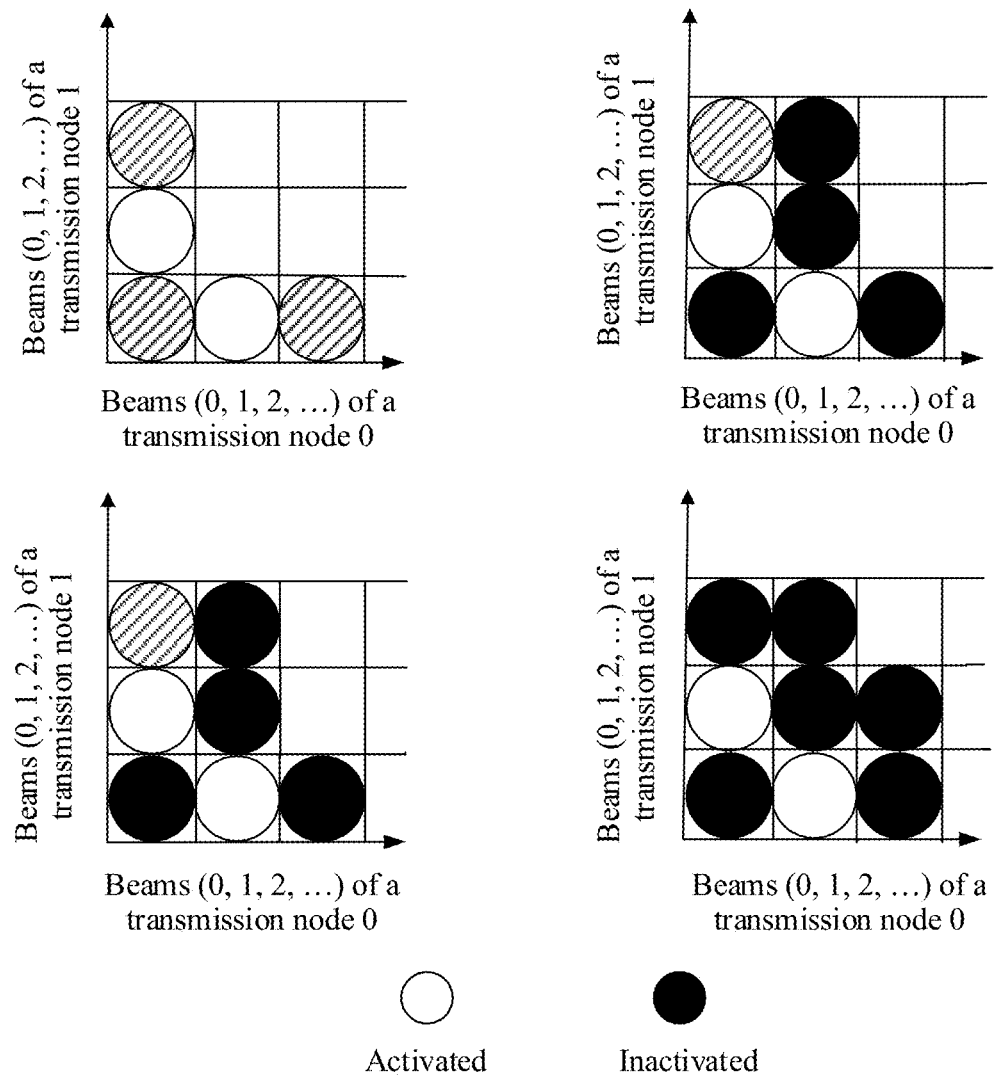
FIG. 11 is a schematic diagram of a method for activating a node in a spatial beam grid according to this application.

FIG. 11 shows steps of the method. In FIG. 11, a white circle indicates that spectral efficiency of the node is greater than spectral efficiency of a node indicated by a circle filled with slashes. A node (0, 1) with maximum spectral efficiency is first activated, two nodes adjacent to the node (0, 1) are inactivated. A node (1, 0) corresponding to a diagonal of the node (0, 1) may be activated, and a node adjacent to the node (1, 0) is inactivated.

FIG. 12 shows an effect of the method. It may be learned from FIG. 12 that any activated nodes do not overlap, so that beam-level transmission timing pre-adjustments are mutually decoupled, and may be separately made. There is only one terminal device in the activated node, and a beam-level transmission timing pre-adjustment may be made to the terminal device.

It should be understood that the lattice model, the constraint condition, the lattice pre-allocation, and the spectral efficiency maximization criterion provided in the method are merely used as examples, and the node in the spatial beam grid may be alternatively activated with reference to a scheduling criterion such as a PF.

It should also be understood that the transmit beam B of the second node may also be determined according to the method for determining the transmit beam A by the first node. The first node and the second node may be nodes of a same type.

Step 330: The first node sends the downlink data to the terminal device by using the beam A based on the transmission time.

Therefore, in this embodiment of this application, the first node adjusts, based on the first adjustment time period, the transmission time in which the downlink data is transmitted to the terminal device by using the beam A, to implement a beam-level signal transmission pre-adjustment on a node side. As a result, a delay difference between arrival, at the terminal device, of the downlink data sent by the first node to the terminal device and arrival, at the terminal device, of the downlink data sent by the second node to the terminal device is less than the predetermined value.

FIG. 13 is a schematic flowchart of a wireless communication method 400 according to this application. The method 400 is used in a coordinated multipoint system that includes a plurality of nodes. As shown in FIG. 13, the method 400 includes the following content.

Step 410: A terminal device determines a first delay difference between receiving a downlink pilot signal from a beam A of a first node and receiving the downlink pilot signal from a beam B of a second node, where the terminal device is located in a coverage area in which the beam A intersects with the beam B.

Step 420: Send the first delay difference to a control device, so that the control device predicts, based on the first delay difference, a delay difference between receiving, by the terminal device, downlink data from the beam A of the first node and receiving, by the terminal device, the downlink data from the beam B of the second node.

Therefore, in this embodiment of this application, the terminal device sends, to the control device, the first delay difference between receiving the downlink pilot signal from the beam A of the first node and receiving the downlink pilot signal from the beam B of the second node. The control device predicts, based on the first delay difference, the first delay difference between receiving, by the terminal device, the downlink data from the beam A of the first node and receiving, by the terminal device, the downlink data from the beam B of the second node, further determines a first adjustment time period for the first node, and controls the first node to send the downlink data to the terminal device by using the beam A based on the first adjustment time period, to implement a beam-level transmission pre-adjustment on a node side. As a result, a delay difference between arrival, at the terminal device, of the downlink data sent by the first node to the terminal device and arrival, at the terminal device, of the downlink data sent by the second node to the terminal device is less than a predetermined value. This resolves an ISI interference problem and a coordinated area shrinkage problem that are introduced due to an inter-TP air interface transmission delay difference and an inter-TP IRF timing error in a coordinated technology, thereby effectively increasing a coordinated area and a coordinated gain particularly in a scenario of a shorter CP in a 5G high-frequency system.

FIG. 14 is a schematic block diagram of a control device 500 according to an embodiment of this application. As shown in FIG. 14, the control device 500 includes:

a prediction module 510, configured to predict a first delay difference between receiving, by a terminal device, downlink data from a beam A of a first node and receiving, by the terminal device, the downlink data from a beam B of a second node, where the terminal device is located in a coverage area in which the beam A intersects with the beam B; and a determining module 520, configured to determine a first adjustment time period based on the first delay difference, where the first adjustment time period is used to adjust a transmission time in which the first node transmits the downlink data to the terminal device by using the beam A, so that a delay difference between receiving, by the terminal device, the downlink data from the beam A and receiving, by the terminal device, the downlink data from the beam B is less than a predetermined value.

Optionally, the prediction module 510 and the determining module 520 are configured to perform operations of the wireless communication method 200 in the embodiments of this application. For brevity, details are not described herein again.

Figure 15:
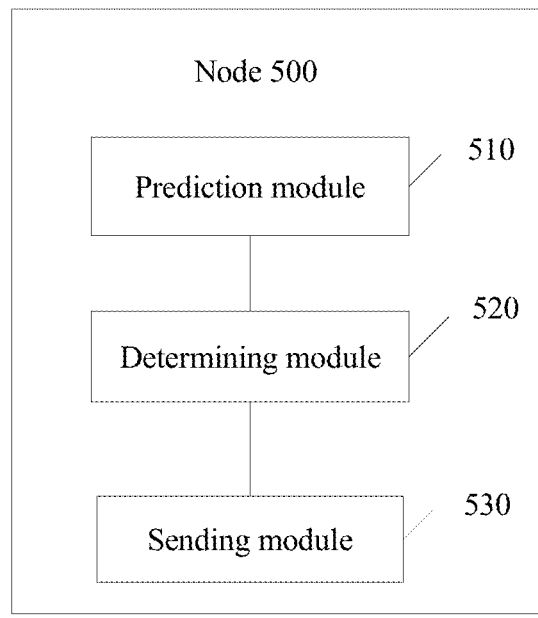
FIG. 15 is a schematic block diagram of a node according to this application.

Optionally, as shown in FIG. 15, the control device 500 may be a node 500. When the control device 500 is the node 500, a processing module of the node 500 is further configured to determine, based on the first adjustment time period, the transmission time in which the downlink data is transmitted to the terminal device by using the beam A. The node further includes a sending module 530, configured to send the downlink data based on the transmission time in which the downlink data is transmitted to the terminal device by using the beam A.

Figure 16:
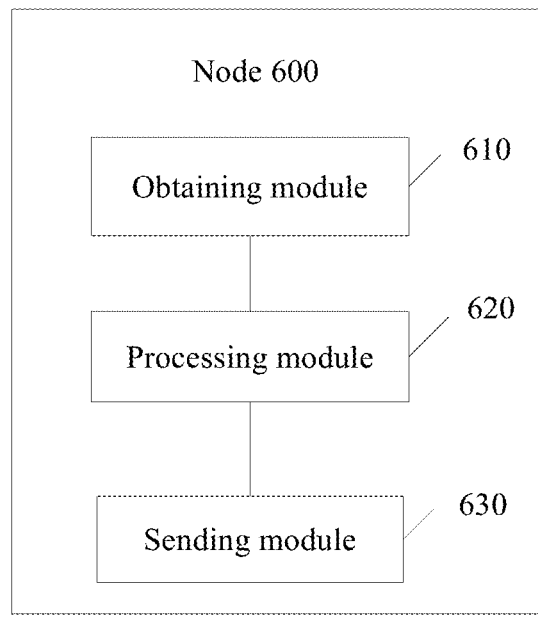
FIG. 16 is a schematic block diagram of a node according to this application.

FIG. 16 is a schematic block diagram of a node 600 according to an embodiment of this application. As shown in FIG. 16, the node 600 includes:

an obtaining module 610, configured to obtain a first adjustment time period, where the first adjustment time period is used to adjust a transmission time in which the first node transmits downlink data to a first terminal device by using a beam A, and the terminal device is located in a coverage area in which the beam A of the first node intersects with a beam B of a second node;

a processing module 620, configured to determine, based on the first adjustment time period, the transmission time in which the downlink data is transmitted to the first terminal device by using the beam A; and a sending module 630, configured to send the downlink data to the first terminal device by using the beam A based on the transmission time.

Optionally, the obtaining module 610, the processing module 620, and the sending module 630 are configured to perform operations of the wireless communication method 300 in the embodiments of this application. For brevity, details are not described herein again.

Figure 17:
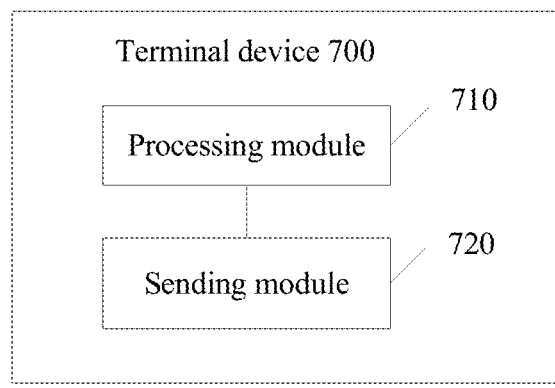
FIG. 17 is a schematic block diagram of a terminal device according to this application.

FIG. 17 is a schematic block diagram of a terminal device 700 according to an embodiment of this application. As shown in FIG. 17, the terminal device 700 includes:

a processing module 710, configured to determine a first delay difference between receiving a downlink pilot signal from a beam A of a first node and receiving the downlink pilot signal from a beam B of a second node, where the terminal device is located in a coverage area in which the beam A intersects with the beam B; and a sending module 720, configured to send the first delay difference to a control device, so that the control device predicts, based on the first delay difference, a delay difference between receiving, by the terminal device, downlink data from the beam A of the first node and receiving, by the terminal device, the downlink data from the beam B of the second node.

Optionally, the processing module 710 and the sending module 720 are configured to perform operations of the wireless communication method 400 in the embodiments of this application. For brevity, details are not described herein again.

Figure 18:
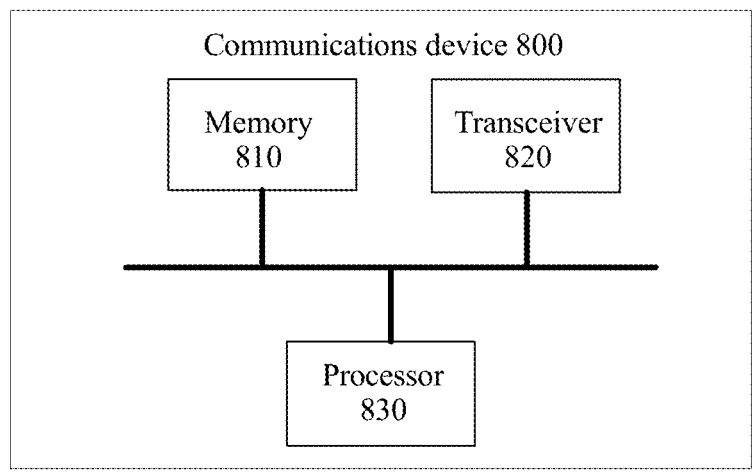
FIG. 18 is a schematic block diagram of a communications device according to this application.

FIG. 18 is a schematic block diagram of a communications device 800 according to an embodiment of this application. The communications device 800 includes:

a memory 810, configured to store a program, where the program includes code;

a transceiver 820, configured to communicate with another device; and a processor 830, configured to execute the program code in the memory 810.

Optionally, when the code is executed, the processor 830 may implement the operations performed by the control device in the method 200. For brevity, details are not described herein again. In this case, the communications device 800 may be a receiving device or a sending device. The transceiver 820 is configured to receive and send a specific signal after being driven by the processor 830.

Optionally, when the code is executed, the processor 830 may alternatively implement the operations performed by the node in the method 300. For brevity, details are not described herein again. In this case, the communications device 800 may be a receiving device or a sending device.

Optionally, when the code is executed, the processor 830 may alternatively implement the operations performed by the terminal device in the method 400. For brevity, details are not described herein again. In this case, the communications device 800 may be a receiving device or a sending device.

It should be understood that in this embodiment of this application, the processor 830 may be a central processing unit (CPU), or the processor 830 may be another general-purpose processor, a digital signal processor, an application-specific integrated circuit, a field programmable gate array or another programmable logic device, a discrete gate or a transistor logic device, a discrete hardware component, or the like. The general-purpose processor may be a microprocessor, or the processor may be any conventional processor, or the like.

The memory 810 may include a read-only memory and a random access memory, and provide an instruction and data to the processor 830. A part of the memory 810 may further include a nonvolatile random access memory. For example, the memory 810 may further store information of a device type.

The transceiver 820 may be configured to implement a signal sending and receiving function such as a frequency modulation and demodulation function or an up-conversion and down-conversion function.

In an implementation process, at least one step in the foregoing methods may be completed by an integrated logic circuit of hardware in the processor 830, or the integrated logic circuit may complete the at least one step after being driven by an instruction in a form of software. Therefore, the communications device 800 may be a chip or a chip group. The steps in the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory. The processor 830 reads information in the memory and completes the steps in the foregoing methods in combination with the hardware of the processor 830. To avoid repetition, details are not described herein again.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, used in a coordinated multipoint system comprising a plurality of nodes, wherein the method comprises:

predicting a first delay difference between receiving, by a terminal device, downlink data from a beam A of a first node and receiving, by the terminal device, downlink data from a beam B of a second node, wherein the terminal device is located in a coverage area in which the beam A intersects with the beam B, and wherein predicting the first delay difference comprises:

obtaining a second delay difference between receiving, by the terminal device, a downlink pilot signal from the beam A of the first node and receiving, by the terminal device, a downlink pilot signal from the beam B of the second node; and predicting the first delay difference based on the second delay difference; and determining a first adjustment time period based on the first delay difference, wherein the first adjustment time period is used to adjust a transmission time in which the first node transmits the downlink data to the terminal device by using the beam A, and wherein a delay difference between receiving, by the terminal device, the downlink data from the beam A and receiving, by the terminal device, the downlink data from the beam B is less than a predetermined value.

2. The method according to claim 1, wherein before the first node transmits the downlink data to the terminal device by using the beam A and the second node transmits the downlink data to the terminal device by using the beam B, the downlink pilot signal from the beam A of the first node and the downlink pilot signal from the beam B of the second node are cell-level pilot signals.

3. The method according to claim 1, wherein when the first node transmits the downlink data to the terminal device by using the beam A and the second node transmits the downlink data to the terminal device by using the beam B, the downlink pilot signal from the beam A of the first node and the downlink pilot signal from the beam B of the second node are user-level pilot signals.

4. The method according to claim 1, wherein the predicting a first delay difference between receiving, by a terminal device, downlink data from a beam A of a first node and receiving, by the terminal device, the downlink data from a beam B of a second node comprises:
obtaining a third delay difference between receiving, by the first node using the beam A, an uplink reference signal transmitted by the terminal device and receiving, by the second node using the beam B, an uplink reference signal transmitted by the terminal device; and
predicting the first delay difference based on the third delay difference.

5. The method according to claim 4, wherein the method further comprises:
controlling the first node and the second node to simultaneously transmit correction signals in an uplink/downlink switching guard period;
obtaining a time in which the first node receives a correction signal sent by the second node and a time in which the second node receives a correction signal sent by the first node; and
determining a fourth delay difference between an intermediate radio frequency channel of the first node and an intermediate radio frequency channel of the second node based on the time in which the first node receives the correction signal sent by the second node and the time in which the second node receives the correction signal sent by the first node; and
wherein the predicting the first delay difference based on the third delay difference comprises:
predicting the first delay difference based on the third delay difference and the fourth delay difference.

6. The method according to claim 1, wherein the method further comprises:
determining a second adjustment time period for the first node based on the first adjustment time period, wherein the second adjustment time period for the first node is used to adjust a transmission time in which the first node transmits a user-level pilot signal to the terminal device in the first node by using the beam A.

7. A control device, used in a coordinated multipoint system comprising a plurality of nodes, wherein the control device comprises:
at least one processor; and
a non-transitory computer-readable storage medium coupled to the at least one processor and storing programming instructions for execution by the at least one processor, wherein the programming instructions instruct the at least one processor to:
predict a first delay difference between receiving, by a terminal device, downlink data from a beam A of a first node and receiving, by the terminal device, the downlink data from a beam B of a second node, wherein the terminal device is located in a coverage area in which the beam A intersects with the beam B, and wherein predicting the first de lay difference comprises:
obtaining a second de lay difference between receiving, by the terminal device, a downlink pilot signal from the beam A of the first node and receiving, by the terminal device, a downlink pilot signal from the beam B of the second node; and
predicting the first de lay difference based on the second delay difference; and
determine a first adjustment time period based on the first delay difference, wherein the first adjustment time period is used to adjust a transmission time in which the first node transmits the downlink data to the terminal device by using the beam A, and wherein a delay difference between receiving, by the terminal device, the downlink data from the beam A and receiving, by the terminal device, the downlink data from the beam B is less than a predetermined value.

8. The control device according to claim 7, wherein before the first node transmits the downlink data to the terminal device by using the beam A and the second node transmits the downlink data to the terminal device by using the beam B, the downlink pilot signal from the beam A of the first node and the downlink pilot signal from the beam B of the second node are cell-level pilot signals.

9. The control device according to claim 7, wherein when the first node transmits the downlink data to the terminal device by using the beam A and the second node transmits the downlink data to the terminal device by using the beam B, the downlink pilot signal from the beam A of the first node and the downlink pilot signal from the beam B of the second node are user-level pilot signals.

10. The control device according to claim 7, wherein the programming instructions instruct the at least one processor to:
obtain a third delay difference between receiving, by the first node using the beam A, an uplink reference signal transmitted by the terminal device and receiving, by the second node using the beam B, an uplink reference signal transmitted by the terminal device; and
predict the first delay difference based on the third delay difference.

11. The control device according to claim 10, wherein the programming instructions instruct the at least one processor to:
control the first node and the second node to simultaneously transmit correction signals in an uplink/downlink switching guard period;
obtain a time in which the first node receives a correction signal sent by the second node and a time in which the second node receives a correction signal sent by the first node; and
determine a fourth delay difference between an intermediate radio frequency channel of the first node and an intermediate radio frequency channel of the second node based on the time in which the first node receives the correction signal sent by the second node and the time in which the second node receives the correction signal sent by the first node; and
wherein the predicting the first delay difference based on the third delay difference comprises:
predicting the first delay difference based on the third delay difference and the fourth delay difference.

12. The control device according to claim 7, wherein the programming instructions instruct the at least one processor to:
determine a second adjustment time period for the first node based on the first adjustment time period, wherein the second adjustment time period for the first node is used to adjust a transmission time in which the first node transmits a user-level pilot signal to the terminal device in the first node by using the beam A.

* * * * *

UNITED STATES PATENT AND TRADEMARK OFFICE
CERTIFICATE OF CORRECTION

| | | |
|---|---|---|
| PATENT NO. | : 11,284,368 B2 | Page 1 of 1 |
| APPLICATION NO. | : 16/563378 | |
| DATED | : March 22, 2022 | |
| INVENTOR(S) | : Jianbiao Xu et al. | |

It is certified that error appears in the above-identified patent and that said Letters Patent is hereby corrected as shown below:

In the Claims

Column 25/Line 57 (Approx.) – In Claim 7, delete "de lay" and insert -- delay --.

Column 25/Line 59 – In Claim 7, delete "de lay" and insert -- delay --.

Column 25/Line 64 – In Claim 7, delete "de lay" and insert -- delay --.

Signed and Sealed this
Fourth Day of October, 2022

Katherine Kelly Vidal
*Director of the United States Patent and Trademark Office*